(12) United States Patent
Weaver, Jr.

(10) Patent No.: US 7,305,839 B2
(45) Date of Patent: Dec. 11, 2007

(54) THERMAL TRANSFER DEVICE AND SYSTEM AND METHOD INCORPORATING SAME

(75) Inventor: Stanton Earl Weaver, Jr., Northville, NY (US)

(73) Assignee: General Electric Company, Niskayuna, NY (US)

( * ) Notice: Subject to any disclaimer, the term of this patent is extended or adjusted under 35 U.S.C. 154(b) by 497 days.

(21) Appl. No.: 10/880,807

(22) Filed: Jun. 30, 2004

(65) Prior Publication Data

US 2006/0000226 A1  Jan. 5, 2006

(51) Int. Cl.
*F25B 21/00* (2006.01)
*F25B 49/00* (2006.01)

(52) U.S. Cl. .................. 62/132; 62/3.1; 62/3.2

(58) Field of Classification Search .................. 62/132, 62/3.1, 3.2; 257/E29.339, E21.121, E21.122; 136/203, 204, 205, 230; 310/306
See application file for complete search history.

(56) References Cited

U.S. PATENT DOCUMENTS

| | | | |
|---|---|---|---|
| 3,169,200 A | 2/1965 | Huffman | 310/4 |
| 3,702,408 A | 11/1972 | Longsderff et al. | 310/4 |
| 4,039,352 A | 8/1977 | Marinesu | 136/205 |
| 4,492,809 A | 1/1985 | Dahlberg | 136/212 |
| 4,667,126 A | 5/1987 | Fitzpatrick | 310/306 |
| 4,755,350 A | 7/1988 | Kennel | 376/321 |
| 5,028,835 A | 7/1991 | Fitzpatrick | 313/14 |
| 5,113,315 A | 5/1992 | Capp et al. | |
| 5,219,516 A | 6/1993 | Horner-Richardson et al. | 376/321 |
| 5,492,570 A | 2/1996 | Horner-Richardson et al. | 136/200 |
| 5,541,464 A | 7/1996 | Johnson et al. | 310/306 |
| 5,637,946 A | 6/1997 | Bushman | 310/306 |
| 5,675,972 A | 10/1997 | Edelson | 62/3.1 |
| 5,973,259 A | 10/1999 | Edelson | 136/254 |
| 5,994,638 A | 11/1999 | Edelson | 136/205 |
| 6,037,697 A | 3/2000 | Begg et al. | 310/306 |
| 6,064,137 A | 5/2000 | Cox | 310/306 |
| 6,084,173 A | 7/2000 | DiMatteo | 136/201 |

(Continued)

FOREIGN PATENT DOCUMENTS

EP   0706196 B1   3/2000

(Continued)

OTHER PUBLICATIONS

Vu Thien Binh and Ch. Adessi; New Mechanism for Electron Emission from Planar Cold Cathodes: The Solid-State Field-Controlled Electron Emitter; vol. 85, No. 4; pp. 864-867; Jul. 24, 2000.

(Continued)

*Primary Examiner*—Chen-Wen Jiang
(74) *Attorney, Agent, or Firm*—Fletcher Yoder (57) ABSTRACT

A thermal transfer device having a first substrate layer, a second substrate layer and first and second electrodes disposed between the first substrate layer and the second substrate layer. The thermal transfer device also includes a release layer disposed between the first electrode and the second electrode and an actuator disposed adjacent the first and second electrodes. The actuator is adapted to separate the first and second electrodes from the release layer to open a thermotunneling gap between the first and second electrodes, and wherein the actuator is adapted to actively control the thermotunneling gap.

47 Claims, 11 Drawing Sheets

U.S. PATENT DOCUMENTS

| | | |
|---|---|---|
| 6,100,621 A | 8/2000 | Rasor et al. ............... 310/306 |
| 6,229,083 B1 | 5/2001 | Edelson ..................... 136/201 |
| 6,232,546 B1 | 5/2001 | DiMatteo et al. ........... 136/253 |
| 6,281,514 B1 | 8/2001 | Tavkhelidze .............. 250/493.1 |
| 6,294,858 B1 | 9/2001 | King et al. ................. 310/306 |
| 6,384,312 B1 | 5/2002 | Ghoshal et al. ............ 136/203 |
| 6,396,191 B1 | 5/2002 | Hagelstein et al. ......... 310/306 |
| 6,407,477 B1 | 6/2002 | King et al. ................. 310/306 |
| 6,417,060 B2 | 7/2002 | Tavkhelidze et al. ....... 438/380 |
| 6,467,275 B1 | 10/2002 | Ghoshal .................... 136/204 |
| 6,489,704 B1 | 12/2002 | Kucherov et al. .......... 310/306 |
| 6,494,048 B1 | 12/2002 | Ghoshal et al. ............... 62/3.7 |
| 6,495,843 B1 | 12/2002 | Tavkhelidze .............. 250/493.1 |
| 6,509,669 B1 | 1/2003 | King et al. ................. 310/306 |
| 6,531,703 B1 | 3/2003 | Tavkhelidze .............. 250/493.1 |
| 6,608,250 B2 | 8/2003 | Ghoshal .................... 136/201 |
| 6,625,990 B2 | 9/2003 | Bell ............................. 62/3.3 |
| 6,651,760 B2 | 11/2003 | Cox et al. .................. 180/65.3 |
| 6,720,704 B1 | 4/2004 | Tavkhelidze et al. ....... 310/306 |
| 7,169,006 B2 * | 1/2007 | Tavkhelidze et al. ......... 445/67 |
| 2001/0046749 A1 | 11/2001 | Tavkhelidze et al. ....... 438/380 |
| 2002/0166839 A1 | 11/2002 | Ghoshal et al. ............... 216/11 |
| 2002/0170172 A1 | 11/2002 | Tavkhelidze et al. ......... 29/842 |
| 2002/0171327 A1 * | 11/2002 | Miller et al. ................ 310/309 |
| 2003/0033818 A1 | 2/2003 | Kucherov et al. ........... 136/204 |
| 2003/0042819 A1 | 3/2003 | Martinovsky et al. ...... 310/306 |
| 2003/0068431 A1 | 4/2003 | Taliashvili et al. ............ 427/58 |
| 2003/0184188 A1 | 10/2003 | Kucherov et al. .......... 310/306 |
| 2004/0029341 A1 | 2/2004 | Cox et al. ................... 438/237 |
| 2004/0031514 A1 | 2/2004 | Bell ........................... 136/203 |
| 2004/0050415 A1 | 3/2004 | Kucherov et al. .......... 136/252 |

FOREIGN PATENT DOCUMENTS

| | | |
|---|---|---|
| WO | WO9913562 A1 | 3/1999 |
| WO | WO9940628 A1 | 8/1999 |
| WO | WO0059047 A1 | 10/2000 |
| WO | WO0139235 A2 | 5/2001 |
| WO | WO0169657 A2 | 9/2001 |
| WO | WO03021663 A1 | 3/2003 |
| WO | WO03021758 A2 | 3/2003 |
| WO | WO03083177 A2 | 10/2003 |
| WO | WO03090245 A1 | 10/2003 |
| WO | WO2004036724 A2 | 4/2004 |

OTHER PUBLICATIONS

Tavkhelidze A et al: "Electron Tunneling Through Large Area Vacuum Gap—Preliminary Results"; Proceedings ICT '02; 21st International conference on Thermoelectronics, Aug. 25-29, 2002, Piscataway, NJ, USA, IEEE, Aug. 25, 2002, pp. 435-438, XP010637519 ISBN: 0-7803-7683-8.

* cited by examiner

THERMAL TRANSFER DEVICE AND SYSTEM AND METHOD INCORPORATING SAME

BACKGROUND

The invention relates generally to thermal transfer devices, and particularly, to alignment and spacing of electrodes in thermal transfer devices.

Thermal transfer devices may be used for a variety of heating and cooling systems, such as refrigeration, air conditioning, electronics cooling, industrial temperature control, power generation, and so forth. These thermal transfer devices are also scalable to meet the thermal management needs of a particular system and environment. Unfortunately, existing thermal transfer devices, such as those having refrigeration cycles, are relatively inefficient due to mechanical components such as compressors.

In contrast, solid-state thermal transfer devices offer certain advantages, such as the potential for higher efficiencies, reduced size, and so forth. For example, thermotunneling devices transfer heat by tunneling electrons from one electrode to another electrode across a nanometer-scale gap. The heat transfer efficiency of these thermotunneling devices depends upon various factors, such as, material characteristics, electrode alignment, electrode spacing, and so forth. For efficient operation of these thermotunneling devices, the electrodes may be mirror images of one another and spacing between the electrodes may be on the order of 1-10 nanometers. Unfortunately, electrode spacing is particularly difficult to achieve and maintain in these thermotunneling devices. Thus, achieving efficient thermotunneling devices can be problematic.

Certain thermotunneling devices have electrodes that are disposed about a sacrificial layer, which is removed during fabrication to create a gap between the electrodes. This fabrication method involves forming a composite by placing a sacrificial layer between two electrodes. Subsequently, the fabrication method splits the composite into two matching electrodes by removing the sacrificial layer, while preserving the physical position of the electrodes. In some cases, external piezo positioners are used to align the electrodes and maintain a gap between the two electrodes. In such systems, the spacing of nanometer precision is difficult to achieve and the two electrodes are not aligned to the desired precision or consistency. Further, incomplete removal of the sacrificial layer may be deleterious to the quality of surface matching of the two electrodes, and may also disrupt the tunneling of electrons.

Accordingly, a need exists for relatively precise control of the spacing and alignment between adjacent electrodes of a thermotunneling device.

BRIEF DESCRIPTION

In accordance with certain embodiments, the present technique has a thermal transfer device including a first substrate layer, a second substrate layer and first and second electrodes disposed between the first substrate layer and the second substrate layer. The thermal transfer device also includes a release layer disposed between the first electrode and the second electrode and an actuator disposed adjacent the first and second electrodes. The actuator is adapted to separate the first and second electrodes from the release layer to open a thermotunneling gap between the first and second electrodes, and wherein the actuator is adapted to actively control the thermotunneling gap.

In accordance with certain embodiments, the present technique has a method of operating a thermal transfer device. The method includes releasing first and second electrodes from a release layer to open a thermotunneling gap between the first and second electrodes and passing hot electrons across the thermotunneling gap to transfer heat between the first and second electrodes. The method also includes actively moving at least one of the first and second electrodes to control the thermotunneling gap.

In accordance with certain embodiments, the present technique has a method of manufacturing a thermal transfer device, including providing a first thermally conductive substrate layer, disposing an actuator over the first thermally conductive substrate layer and positioning a first electrode adjacent the actuator. The method includes disposing a release layer over the first electrode, positioning a second electrode over the release layer and providing a second thermally conductive substrate layer over the second electrode.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
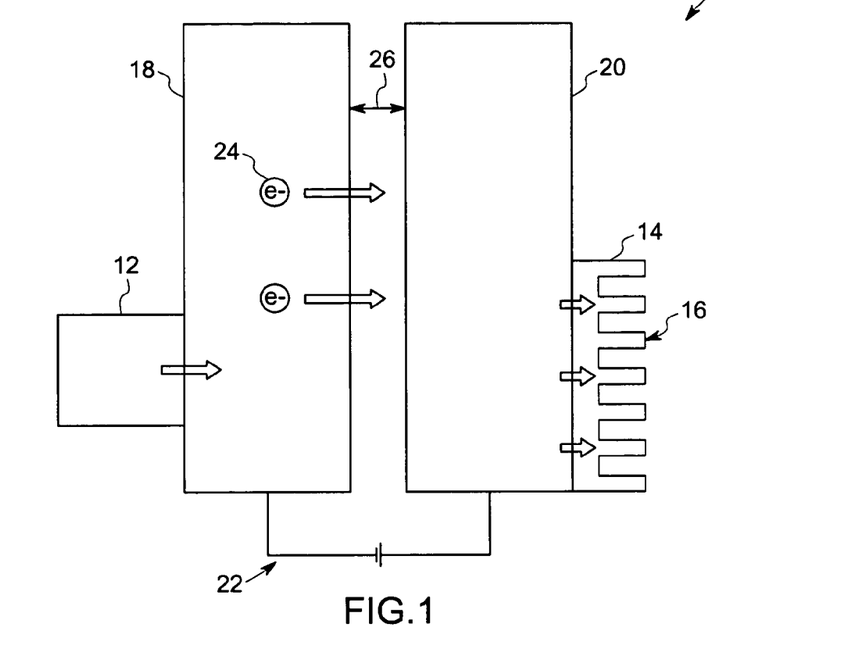
FIG. 1 is a block diagram illustrating a system with a thermal transfer device in accordance with embodiments of the present technique.

Referring now to FIG. 1, a system 10 with a thermal transfer device is illustrated. The system 10 comprises an area or object 12 that is cooled by transferring the heat from the object 12 to a heat sink 14. The heat sink 14 with fins 16 as shown in the figure receives the heat from the object 12 by a thermotunneling mechanism, as described in greater detail below. The illustrated system 10 comprises a first electrode 18 thermally coupled to the object 12 and a second electrode 20 that is thermally coupled to the heat sink 14. Further, an input current source 22 is coupled to the first electrode 18 and the second electrode 20 to initiate a flow of current through the first and second electrodes 18 and 20 respectively. In operation, an input current passes through the electrodes 18 and 20 via the tunneling current input source 22, thereby carrying heat from the object 12 through flow of electrons 24 that tunnel over a thermotunneling gap 26 to the heat sink 14. At the heat sink 14, the fins 16 facilitate heat transfer away from the system 10. The thermotunneling gap 26 comprises a spacing ranging between approximately 1 nanometer to about 10 nanometers to ensure that the direction of the heat flow is one way, thus making the object 12 cooler and transferring the heat to the heat sink 14.

Figure 2:
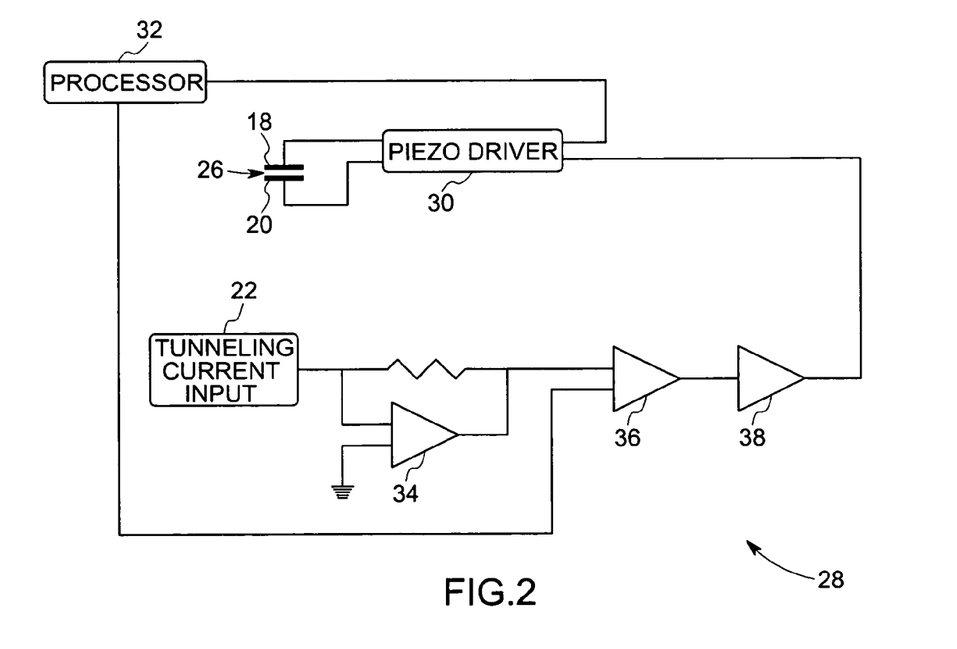
FIG. 2 is a block diagram of an exemplary control circuit for active gap control of electrodes of system of FIG. 1 in accordance with embodiments of the present technique.

In certain embodiments, the thermotunneling gap 26 between the first electrode 18 and the second electrode 20 is maintained via a control circuit 28 as shown in FIG. 2. The illustrated control circuit 28 comprises an actuator, such as piezoelectric driver 30, that is coupled to the first electrode 18 and the second electrode 20. Alternatively, the actuator may comprise an electrostatic actuator, a magnetic actuator, an acoustic actuator, Micro-Electro-Mechanical Systems (MEMS) device (e.g., MEMS mechanical flexure, lever or cantilever), or another suitable actuator. The piezoelectric driver 30, or another suitable actuator, is configured to actively control the thermotunneling gap 26. In addition, a processor 32, a feedback mechanism 34, a comparator 36, and an integrator 38 are coupled to the piezoelectric driver 30 and the tunneling current input source 22 to control and maintain the desired thermotunneling gap 26. In operation, the thermotunneling of electrons is initiated by operating the tunneling current input source 22 at an initial tunneling set point. Subsequently, the tunneling current across the first electrode 18 and the second electrode 20 is measured via the feedback mechanism 34. Moreover, the feedback mechanism 34 may comprise a current amp to adjust the current across the electrodes 18 and 20 based on the measured tunneling current. However, other types of feedback mechanisms 34 may be used within the scope of the present technique.

In operation, the comparator 36 compares a reference value with the measured tunneling current across the first electrode 18 and the second electrode 20. The integrator 38 then communicates this measured current to the processor 32. The processor 32 provides a target position of the first electrode 18 and the second electrode 20 to the piezoelectric driver 30 based upon the measured tunneling current across the first electrode 18 and the second electrode 20. As a resulting response to this target position, the piezoelectric driver 30 adjusts the position of the first and/or second electrodes 18 and 20 to attain the desired thermotunneling gap 26 between the first electrode 18 and the second electrode 20. Advantageously, this feedback-controlled adjustment of the thermotunneling gap 26 facilitates the thermotunneling of the electrons between the first and second electrodes 18 and 20, respectively.

Figure 3:
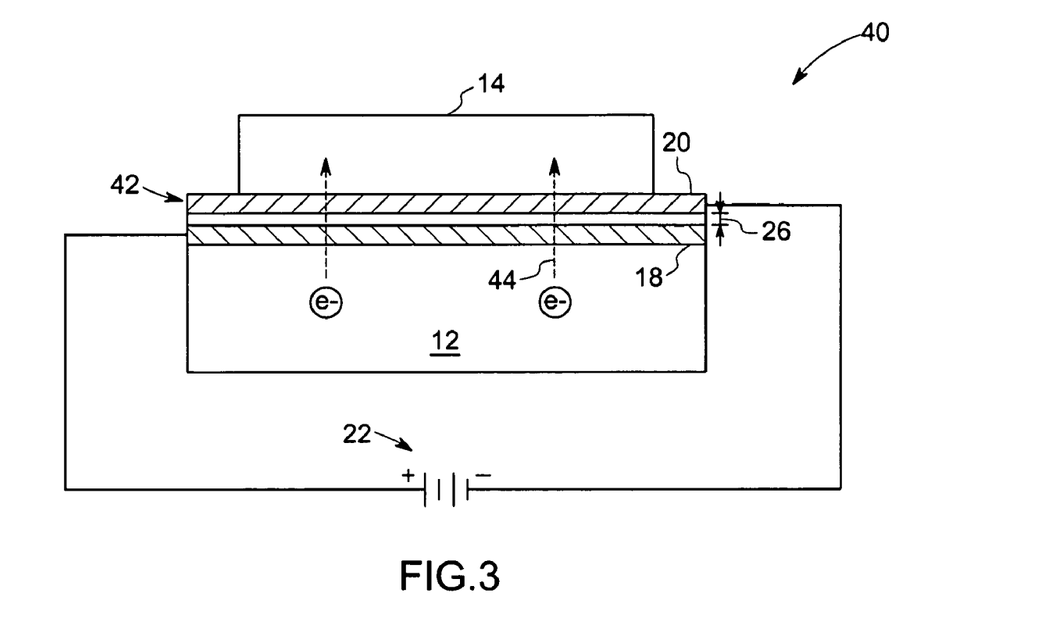
FIG. 3 is a diagrammatic representation of a cooling system with a thermal transfer device in accordance with embodiments of the present technique.

FIG. 3 illustrates a cooling system 40 having a thermal transfer device 42 in accordance with embodiments of the present technique. The thermal transfer device 42 comprises the first electrode 18 and the second electrode 20 separated by the thermotunneling gap 26. As illustrated, the first electrode 18 is thermally coupled to the object/area 12 and the second electrode 20 is thermally coupled to the object/area 14. Further, the first electrode 18 and the second electrode 20 are coupled to the tunneling current input source 22 with the polarity as shown in the figure. The thermal transfer device 42 is activated at the initial tunneling current through the tunneling current input source 22. As the current flows through the first electrode 18 and the second electrode 20, the electrons move from the object 12 towards the object 14 in a direction 44 over the thermotunneling gap 26. The movement of electrons in the direction 44 transfers heat away from the object 12, across the gap 26, and into the object 14, wherein the heat is further transferred away from the system 40. Advantageously, this thermotunnelling-based heat transfer cools the object 12.

Figure 4:
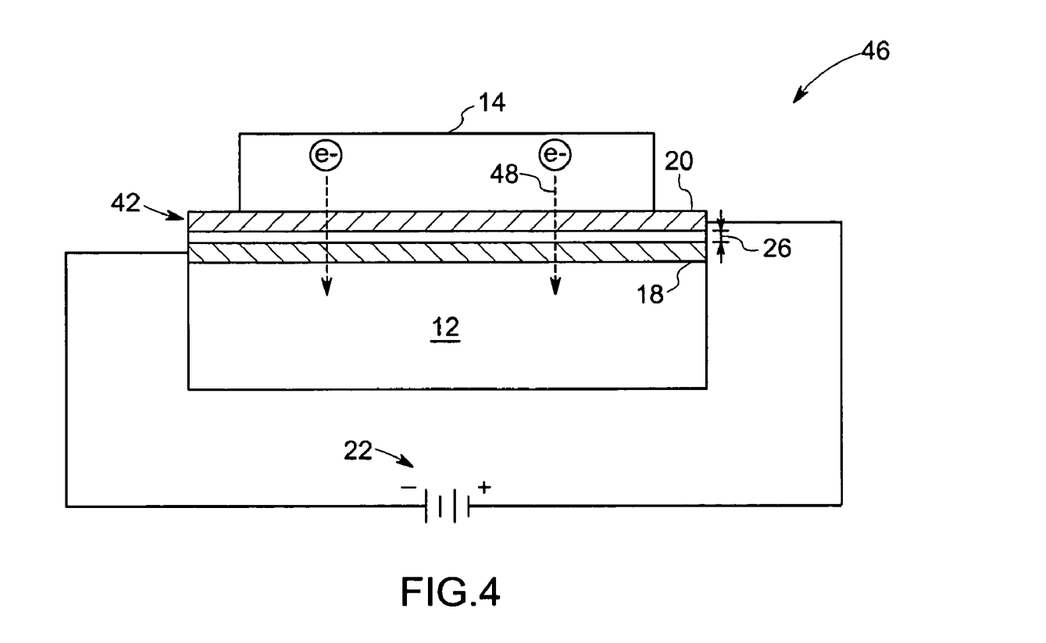
FIG. 4 is a diagrammatic representation of a heating system with a thermal transfer device in accordance with embodiments of the present technique.

FIG. 4 illustrates a heating system 46 having the thermal transfer device 42 in accordance with the embodiments of the present technique. As described above, the thermal transfer device 42 includes the two electrodes 18 and 20, which are thermally coupled to the objects 12 and 14, respectively. In addition, the thermal transfer device 42 is coupled to the tunneling current input source 22. As illustrated, the polarity of the tunneling current input source 22 in the heating system 46 is reversed as compared to the cooling system 40 as shown in FIG. 3. This enables the electrons to flow from the object 14 to the object 12 in a direction 48, thus heating the object 12 by transferring heat from the object 14 to the object 12. The thermal transfer device 42 as described above may be fabricated by a variety of techniques, such as the exemplary techniques described in detail below with reference to FIGS. 5, 6, 7, 8 and 9.

Figure 5:
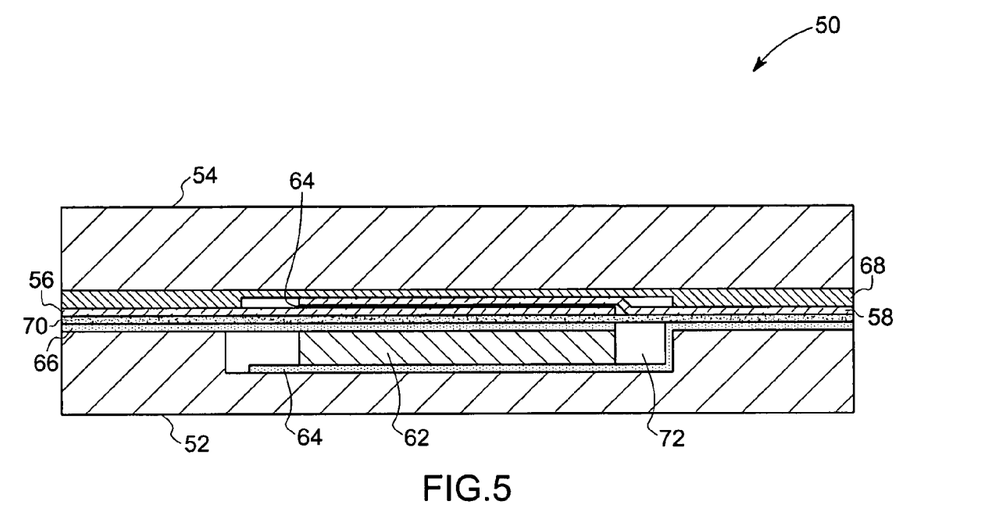
FIG. 5 is a diagrammatic illustration of a thermal transfer device with planar gap control of electrodes in accordance with embodiments of the present technique.

Turning first to FIG. 5, a thermal transfer device 50 is illustrated with planar gap control of electrodes in accordance with embodiments of the present technique. The thermal transfer device 50 comprises a first thermally conductive substrate layer 52 and a second thermally conductive substrate layer 54. The first and second thermally conductive substrate layers 52 and 54 comprise a conductive material, such as a ceramic, a metal, a metal composite, or a filled polymer. In the illustrated embodiment, the first and second thermally conductive substrate layers 52 and 54 are disposed about first and second electrodes 56 and 58, such that the second electrode 58 is disposed above the first electrode 56. The first and second electrodes 56 and 58 comprise a conducting material, such as copper, silver, nickel, gold, platinum. Alternatively, the first and second electrodes 56 and 58 may comprise a stack of conducting materials, such as copper and nickel, nickel and gold, copper nickel platinum, and so forth. In one embodiment, at least one of the first and second electrodes 56 and 58 comprises a carbon nanotube layer. In other embodiments, the electrodes 56 and 58 may comprise an alkaline metal, such as cesium or barium. In such embodiments, these electrode materials (e.g., cesium) may incorporated into the thermal transfer device 50 in a gaseous phase. For example, during the manufacturing process, the thermal transfer device 50 may be heated in vacuum and, then, the cesium gas may be back diffused into the thermal transfer device 50 to form the electrodes 56 and 58.

In addition to the foregoing features of FIG. 5, a release layer 60 is disposed between the first electrode 56 and the second electrode 58 to facilitate the desired thermotunneling gap between the first and second electrodes 56 and 58 by operating an actuator 62. For example, the illustrated release layer 60 may comprise gold, platinum, rhenium, ruthenium, rhodium, palladium, silver, osmium, iridium (noble metals), or other nonoxidizing materials, which enable separation of the first and second electrodes 56 and 58 via the actuator 62. Initially, the actuator 62 is adapted to separate the release layer 60 between the first and second electrodes 56 and 58. In operation of the thermal transfer device 50, the actuator 62 is adapted to actively control the thermotunneling gap between the first and second electrodes 56 and 58, e.g., via feedback or closed-loop control. In certain embodiments of the present technique, the actuator 62 may comprise a piezoelectric mechanism, a magnetic repulsion mechanism, an electrostatic mechanism, an acoustic actuator, a Micro-Electro-Mechanical Systems (MEMS) device (e.g., MEMS mechanical flexure, lever or cantilever), and so forth. Other actuator mechanisms are also within the scope of the present technique.

As further illustrated in FIG. 5, the thermal transfer device 50 comprises first and second actuator electrodes 64 and 66 disposed between the first and second thermally conductive substrate layers 52 and 54. In addition, a sealant layer 68 is disposed between the first and second thermally conductive substrate layers 52 and 54 to reduce thermal back transfer during operation of the thermal transfer device 50. The sealant layer 68 comprises a sealing material, for example, solder, frit glass, epoxy, filled epoxy, metal alloy, and so forth. In certain embodiments, a support layer film 70 also may be disposed between the second actuator electrode 66 and the first electrode 56. As described in further detail below, the thermal transfer device 50 may be fabricated using a sequential layering or building process. In addition, the inner chamber 72 between the first thermally conductive substrate layer 52 and the second thermally conductive substrate layer 54 may be in vacuum, such that operation of the actuator 62 can more accurately attain the thermotunneling gap between the first and second electrodes 56 and 58.

Figure 6:
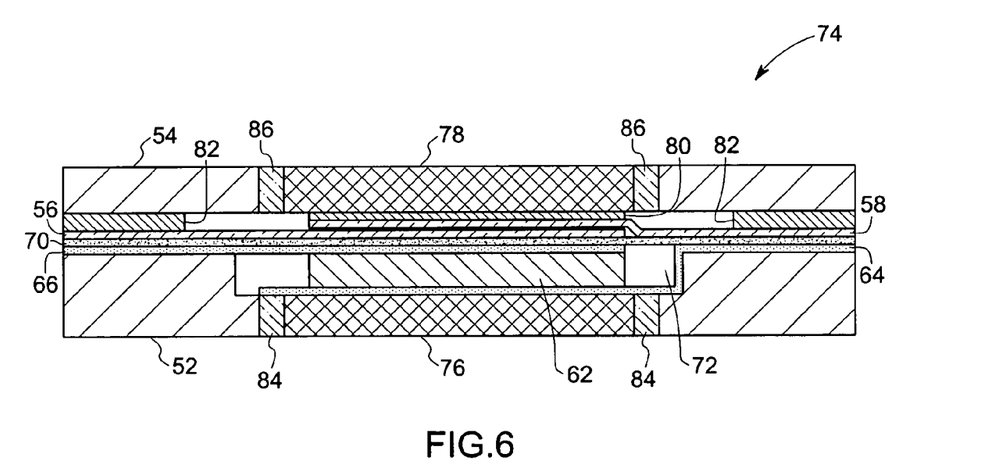
FIG. 6 is a diagrammatic illustration of a thermal transfer device with planar gap control of electrodes in accordance with embodiments of the present technique.

Turning now to FIG. 6, a thermal transfer device 74 is illustrated according to another embodiment of the present technique. The thermal transfer device 74 comprises similar elements as described above with reference to FIG. 5 with certain additional features that will be described hereinafter. In this embodiment, the first thermally conductive layer 52 comprises a first heat spreader, such as first copper spreader 76, that is disposed in thermal communication with the first electrode 56. In addition, the second thermally conductive layer comprises a second heat spreader, such as second copper spreader 78, that is disposed in thermal communication with the second electrode 58. In other embodiments, the heat spreaders 76 and 78 may comprise other thermally conductive materials, such as aluminum, AlSiC, CuMoly, silver, metal covered pyrolitic graphite and filled polymers. An inner sealant layer 80 also may be disposed between the first copper spreader 76 and the second copper spreader 78. In addition, an outer sealant layer 82 may be disposed between the first thermally conductive substrate layer 52 and the second thermally conductive substrate layer 54 to reduce the thermal back transfer during operation of the thermal transfer device 74.

Also, a lower thermal break 84 is provided that extends between the first copper spreader 76 and the first thermally conductive substrate layer 52 to prevent the lateral heat flow. Similarly, an upper thermal break 86 is provided that extends between the second copper spreader 78 and the second thermally conductive substrate layer 54. The lower and upper thermal breaks 84 and 86 comprise a material that prevents the flow of heat in the lateral direction. For example, the lower and upper thermal breaks 84 and 86 may comprise a material, such as glass, epoxies, polymers, acrylics, polycarbonate, sol gel materials, and so forth.

Figure 7:
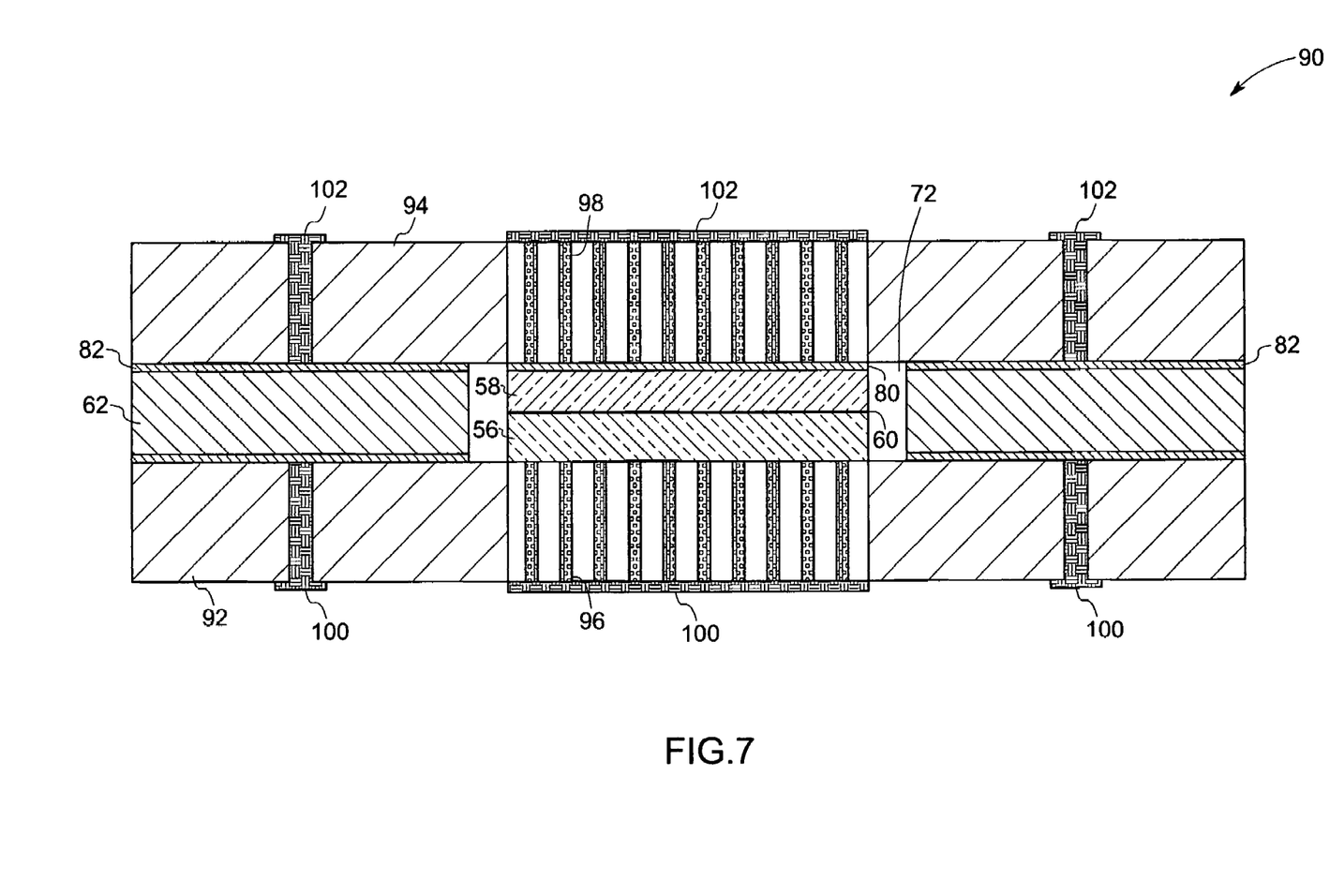
FIG. 7 is a diagrammatic illustration of a thermal transfer device with non-planar gap control of electrodes in accordance with embodiments of the present technique.
Figure 8:
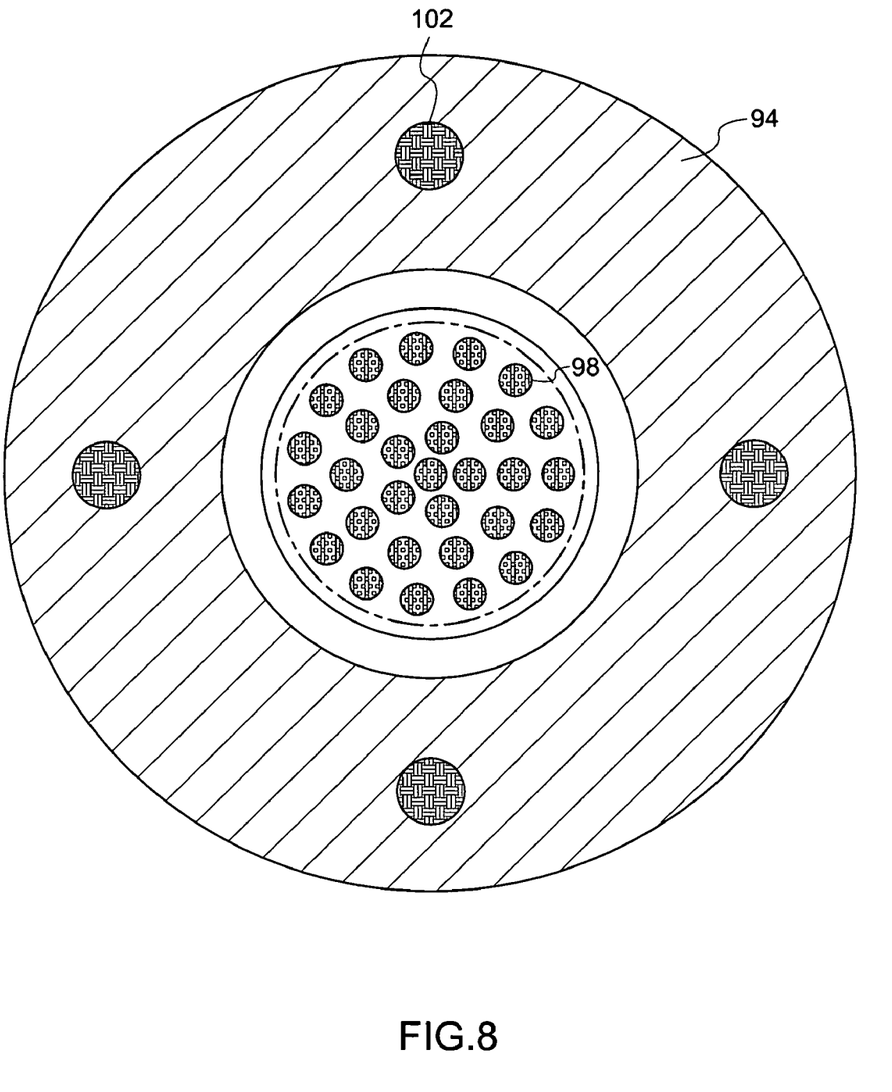
FIG. 8 is a top down view of the thermal transfer device of FIG. 7 in accordance with embodiments of the present technique.

FIGS. 7 and 8 illustrate a thermal transfer device 90 having three-dimensional gap control of electrodes in accordance with embodiments of present technique. The thermal transfer device 90 comprises a first insulating substrate layer 92 and a second insulating substrate layer 94. The first and second insulating substrate layers 92 and 94 respectively comprise an insulating material, such as epoxy, polymers, acrylics, polycarbonates, and so forth. The first insulating substrate layer 92 comprises a first set of thermal vias 96 and the second insulating substrate layer 94 comprises of a second set of thermal vias 98. The thermal vias 96 and 98 may comprise a conductive material, such as copper, silver, CuMoly, AlSiC, metal filled polymers, solders, and so forth. In this embodiment, the first electrode 56 is disposed between the first and second insulating substrate layers 92 and 94 respectively, where the first electrode 56 is placed adjacent the first set of thermal vias 96. Similarly, the second electrode 58 is disposed between the first and second insulating substrate layers 92 and 94 respectively, where the second electrode 58 is placed adjacent the second set of thermal vias 98. The first and second electrodes 56 and 58 may comprise a conductive material, such as copper, silver, nickel, gold, platinum, and so forth. Alternatively, the first and second electrodes 56 and 58 may comprise first and second plated electrode layers.

The thermal vias 96 and 98 are adapted to enhance the thermal and electrical conduction across the first electrode 56 and the second electrode 58. As described above, the release layer 60 is disposed between the first and second electrodes 56 and 58 to facilitate the desired thermotunneling gap between the first electrode 56 and the second electrode 58 by operation of the actuator 62. In some embodiments, the actuator 62 comprises a plurality of actuator 62 mechanisms peripherally disposed about the thermotunneling gap. The plurality of actuators 62 function to adjust both a gap distance and a gap alignment between the first and second electrodes 56 and 58.

In this embodiment, the actuator 62 comprises first and second outer contact pads 100 and 102 that are coupled to the actuator 62 at outer portions of the first and the second insulating substrate layers 92 and 94, respectively. Additionally, an inner and outer thermally conductive adhesive layers 80 and 82 are disposed between the actuator 62 and each of the first and second insulating substrate layers 92 and 94 in thermal contact with the first and second electrodes 56 and 58, respectively. Again, the illustrated thermal transfer device 90 may be fabricated in a sequential layering or building process. Moreover, the thermotunneling gap between the first and the second electrodes 56 and 58 is achieved and maintained via multiple actuators 62.

Figure 9:
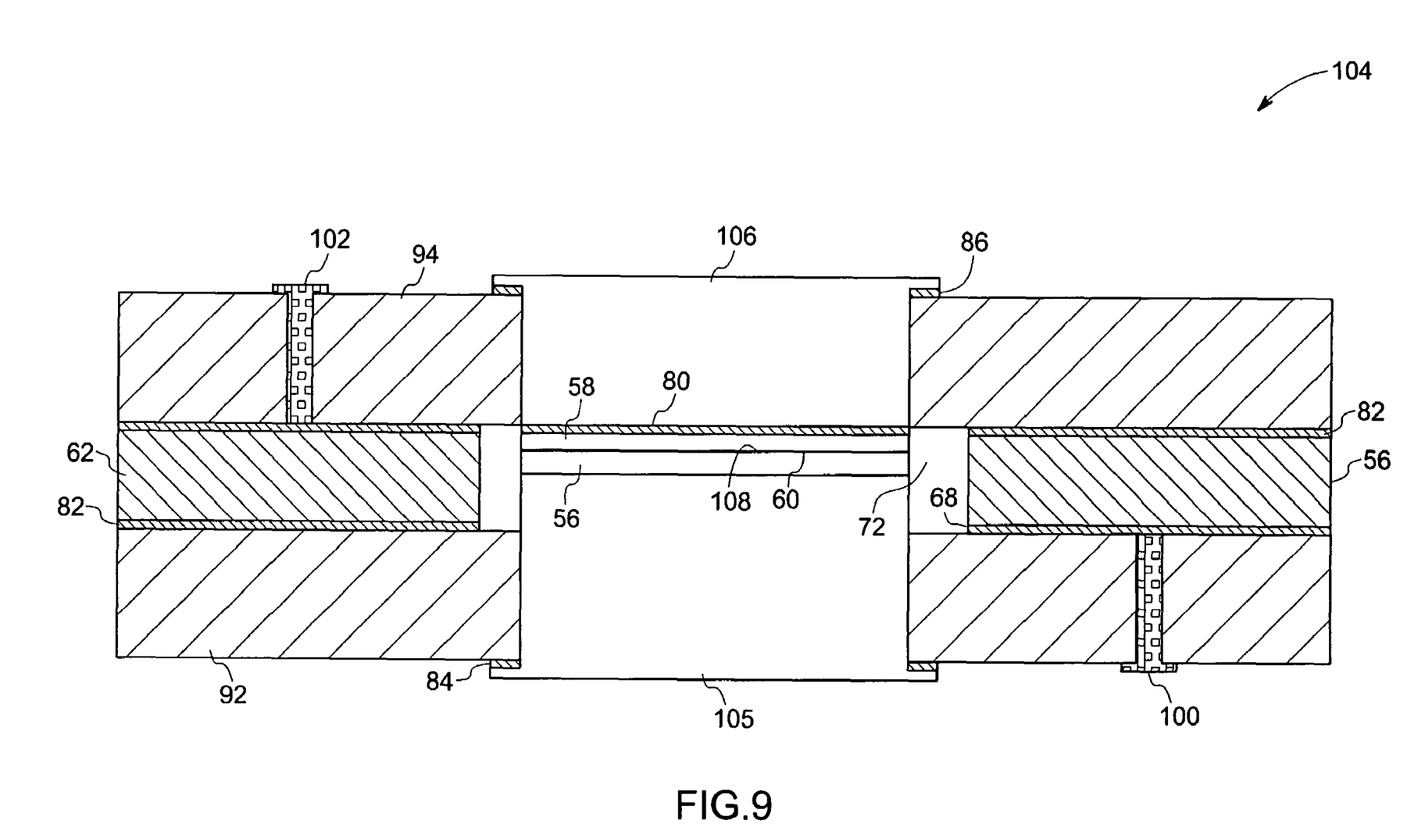
FIG. 9 is a diagrammatic illustration of a thermal transfer device with non-planar gap control of electrodes in accordance with embodiments of the present technique.

Referring now to FIG. 9 a thermal transfer device 104 is illustrated with three-dimensional gap control according to another embodiment of the present technique. Again, the elements of the thermal transfer device 104 may be similar to the features as described above with reference to FIG. 7 with certain additional features that will be described in detail below. The thermal transfer device 104 comprises the first insulating substrate layer 92 and the second insulating substrate layer 94. In addition, a first thermally conductive member 105 is disposed through the first insulating substrate layer 92 and a second thermally conductive member 106 is disposed through the second insulating substrate layer 94.

The first electrode 56 is thermally coupled to the first thermally conductive member 105 between the first insulating substrate layer 92 and the second insulating substrate layer 94. Similarly, the second electrode 58 is thermally coupled to the second thermally conductive member 106 between the first insulating substrate layer 92 and the second insulating substrate layer 94. The first electrode 56 and the second electrode 58 may comprise copper or other suitable materials, as described in detail above. Alternatively, the first electrode 56 and the second electrode 58 may comprise first and second plated electrode layers, respectively. The plated layers may comprise a stack of copper and nickel or other suitable material layers, as described in detail above. The release layer 60 is disposed between the first electrode 56 and the second electrode 58. Further, the actuator 62 is disposed between the first insulating substrate layer 92 and the second insulating substrate layer 94. In operation, as described in detail above, the actuator 62 operates to separate the first and second electrodes 56 and 58 from the release layer 60 and, thereafter, control the thermotunneling gap between the first and second electrodes 56 and 58.

The first insulating substrate layer 92 and the second insulating substrate layer 94 may comprise epoxy though other material with insulating properties may be used. The first thermally conductive member 105 and the second thermally conductive member 106 may comprise a conductive material, for example, a copper slug that is inserted into a receptacle in one of the first 92 and second 94 insulating substrate layers, respectively. Further, the actuator 62 also comprises first and second outer contact pads 100 and 102 that are coupled to the actuator 62 at outer portions of the first and second substrate layers 92 and 94, respectively. The thermal transfer device 104 also comprises an adhesion layer 108 disposed between the first electrode 56 and the release layer 60. The adhesion layer 108 may comprise an adhesive material, for example, Titanium, Tungsten, and so forth.

Figure 10:
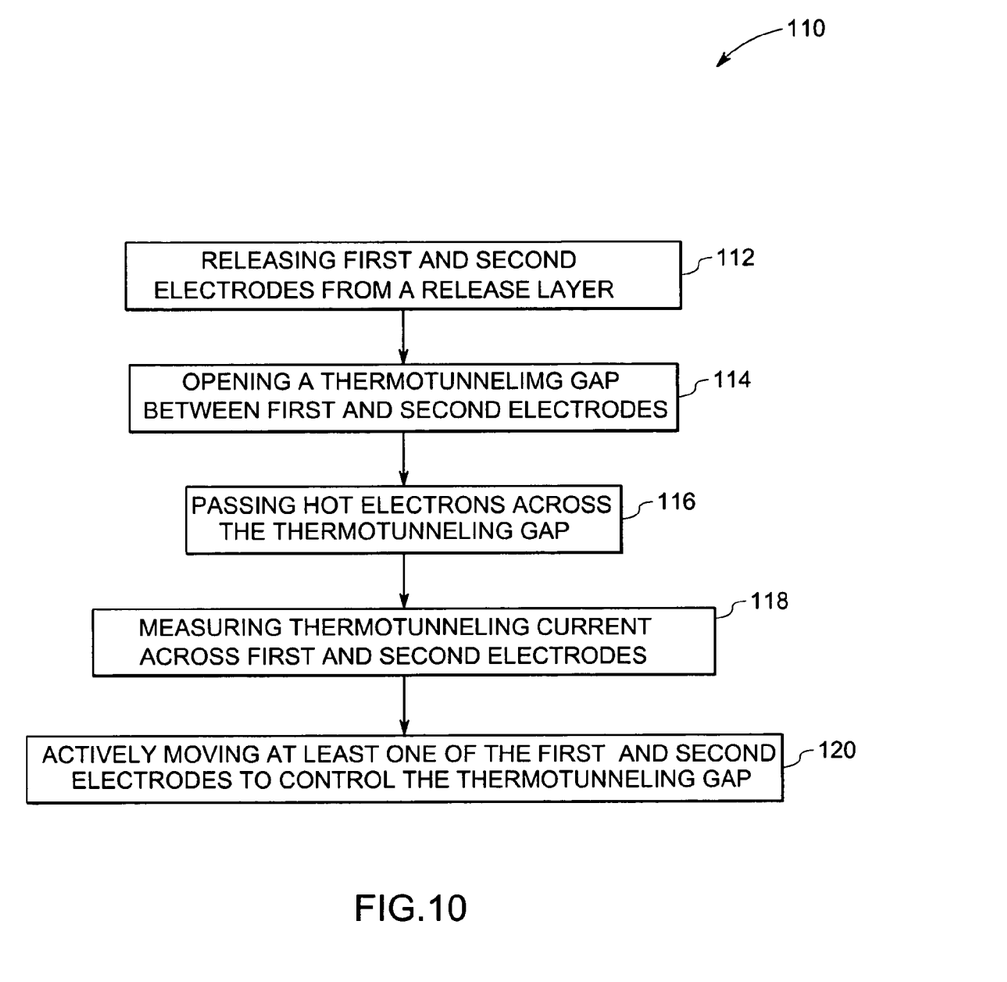
FIG. 10 illustrates process steps for a method of operation of the thermal transfer devices of FIG. 5 and FIG. 6 in accordance with embodiments of the present technique.

The thermal transfer devices described in detail above can be operated in various ways, such as the exemplary processes described in detail below with reference to FIGS. 10 and 11. Referring first to FIG. 10, a flow chart illustrates an exemplary method 110 of operation of the thermal transfer devices of FIG. 5 and FIG. 6 in accordance with embodiments of the present technique. The process 110 begins by releasing first and second electrodes from a release layer (block 112). For example, the releasing of the first and second electrodes may be achieved by operating the thermal transfer device at an initial tunneling set point, such that an actuator biases the first and second electrodes apart from one another based on feedback. By further example, the process 110 may involve placing the thermal transfer device inside a vacuum chamber and adjusting the temperature of the chamber, such that a sealant layer inside the thermal transfer device is melted. Subsequently, passing an electric current through the first and second electrodes activates the actuator.

At block 114, the initial flow of current through the first and second electrodes enables opening of a thermotunneling gap between the first and second electrodes. Next, at block 116, the process 110 initiates passing of hot electrons across the thermotunneling gap, thereby facilitating the transfer of heat from first electrode to the second electrode. As described in detail above, the direction of heat transfer may depend on the polarity of the tunneling input current source. The passing of electrons from first electrode to the second electrode may result in cooling a first member in thermal communication with the first electrode or cooling of a closed environment. Additionally, passing of electrons from first electrode to the second electrode may result in heating a second member in thermal communication with the second electrode or heating of a closed environment. Further, heat may be transferred between at least one of the first and second electrodes and a plurality of thermal vias extending through a thermally insulated layer.

The process 110 then proceeds to measure the thermotunneling current across the first and second electrodes (block 118). The thermotunneling current may be measured via a feedback device, such as current amp that is coupled to the first and second electrodes respectively. At block 120, the process 110 controls the thermotunneling gap between the first and second electrodes by actively moving at least one of the first and second electrodes to adjust a heat transfer efficiency of the thermotunneling gap. The position of at least one of the first and second electrodes is adjusted by an actuator, which operates in response to the measured thermotunneling current between the first and the second electrodes.

Figure 11:
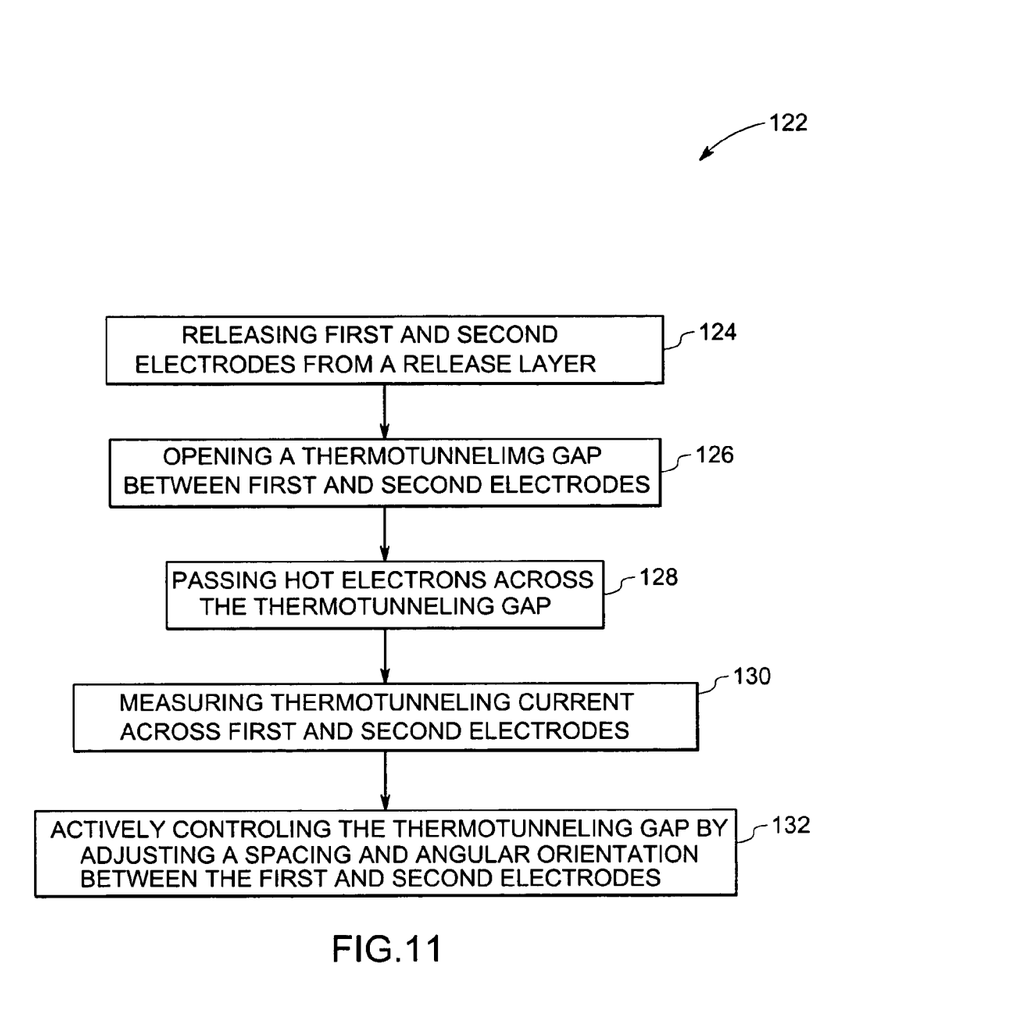
FIG. 11 illustrates process steps for a method of operation of the thermal transfer device of FIG. 7 and FIG. 9 in accordance with embodiments of the present technique.

Turning now to FIG. 11, a flow chart illustrates an exemplary method 122 of operation of the thermal transfer devices of FIG. 7 and FIG. 9 in accordance with embodiments of the present technique. The process 122 illustrates the three-dimensional gap control for the first and second electrodes in the thermal transfer device. The process 122 begins by releasing first and second electrodes from a release layer (block 124). The releasing of the first and second electrodes is achieved by operating the thermal transfer device at an initial tunneling set point. Subsequently, passing an electric current through the first and second electrodes activates an actuator.

At block 126, the initial flow of current through the first and second electrodes enables opening of a thermotunneling gap between the first and second electrodes. Next, at block 128, the process 122 initiates passing of hot electrons across the thermotunneling gap that enables the transfer of heat from first electrode to the second electrode. The direction of heat transfer may depend on the polarity of the tunneling input current source. As a result, a first member in thermal communication with the first electrode may be cooled and a second member in thermal communication with the second electrode may be heated.

The process 122 then proceeds to measure the thermotunneling current across the first and second electrodes (block 130). At block 132, the process 122 actively controls the thermotunneling gap between the first and the second electrodes by adjusting both a gap spacing and a gap angular orientation between the electrodes based upon the measured thermotunneling current. Here, the position of at least one of the first and second electrodes is adjusted by engaging a plurality of actuators on the different sides. The adjustment of the position of the electrodes is achieved by passing an input current through a plurality of the actuators.

Figure 12:
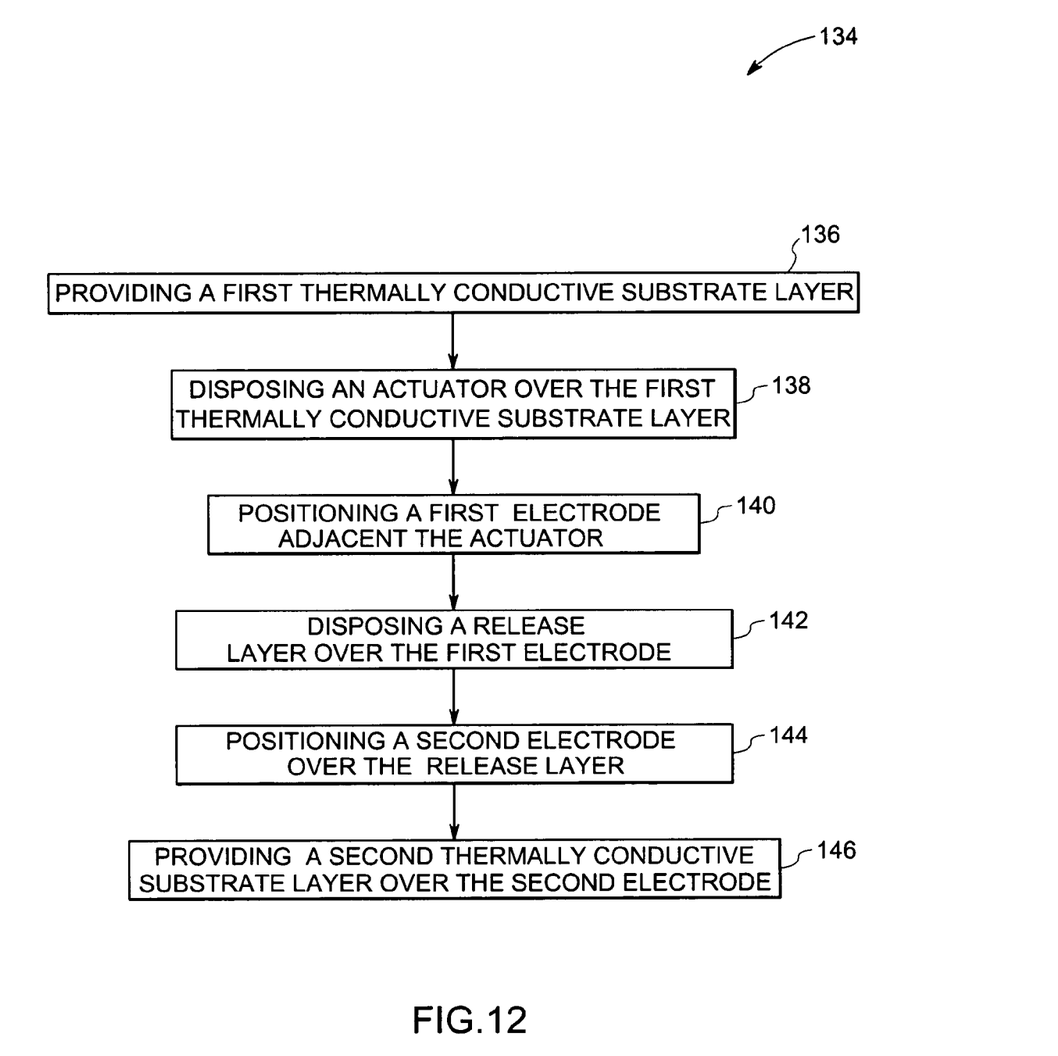
FIG. 12 illustrates process steps for a method of manufacturing the thermal transfer devices of FIG. 5 and FIG. 6 in accordance with embodiments of the present technique.
Figure 13:
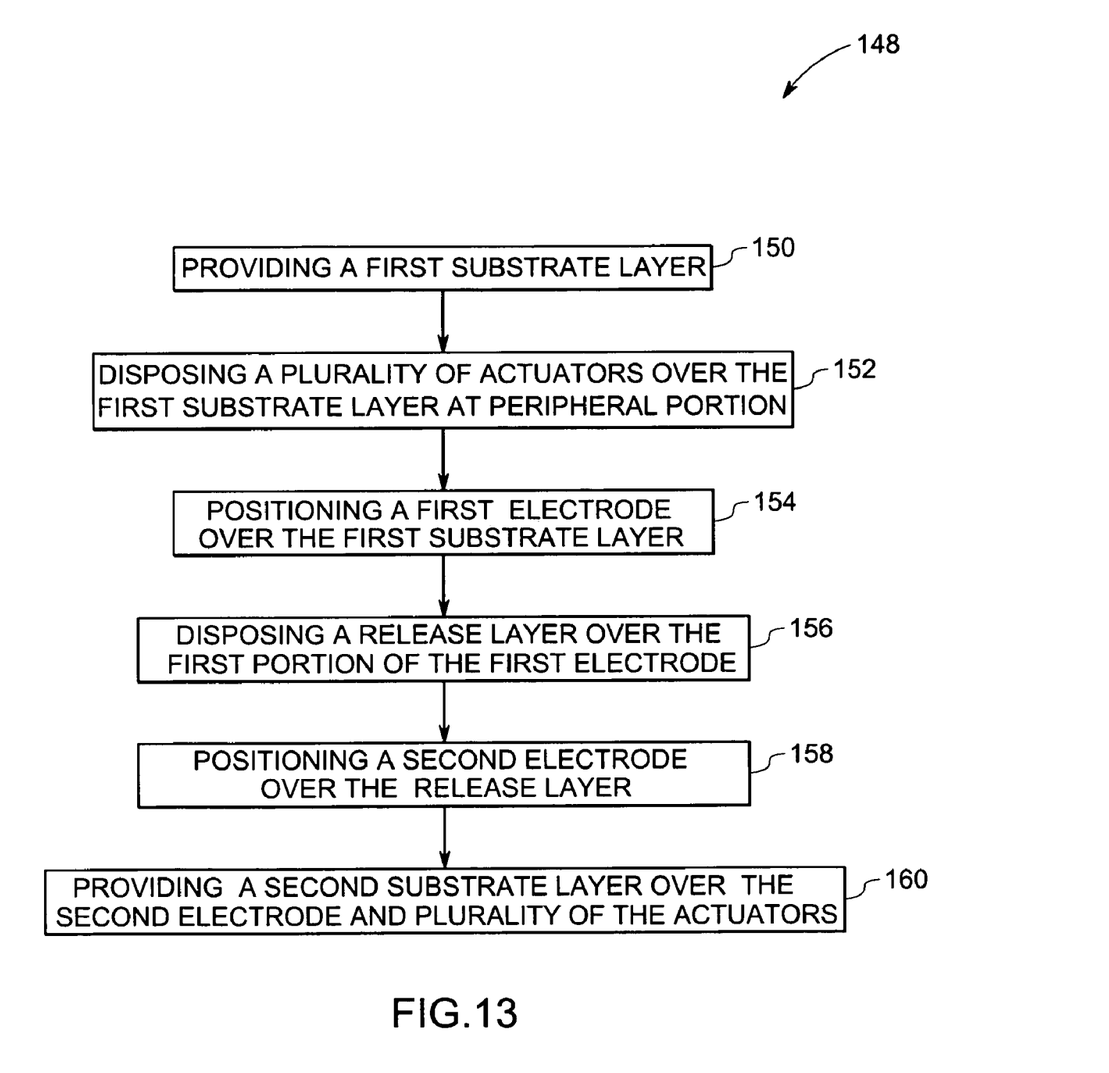
FIG. 13 illustrates process steps for a method of manufacturing the thermal transfer devices of FIG. 7 and FIG. 9 in accordance with embodiments of the present technique.

FIG. 12 and FIG. 13 illustrate an exemplary method of manufacturing the thermal transfer devices of FIGS. 5-9. Referring first to FIG. 12, a flow chart illustrates an exemplary method 134 of manufacturing of the thermal transfer devices of FIG. 5 and FIG. 6 in accordance with embodiments of the present technique. The process 134 begins by providing a first thermally conductive substrate layer (block 136). Alternatively, the process 134 may provide an insulating substrate having one or more thermally conductive members extending therethrough, e.g., a plurality of vias. Next, an actuator is disposed over the first thermally conductive substrate layer (block 138). For example, the actuator may comprise a piezoelectric mechanism, a magnetic repulsion mechanism, or an electrostatic mechanism. Moreover, the process 134 may include extending first and second actuator electrodes to the actuator. In addition, this step 138 may comprise coupling the actuator to an input voltage source adapted to operate the thermal transfer device at an initial tunneling set point.

Further, at block 140, the first electrode is positioned adjacent the actuator. At block 142, a release layer is disposed over the first electrode. At block 144, a second electrode is positioned over the release layer. As discussed in detail above, the release layer facilitates the separation of the first and second electrodes to create and to maintain a thermotunneling gap by operation of the actuator. In addition, a sealant layer may be disposed over the second electrode and the first thermally conductive substrate layer. At block 146, a second thermally conductive substrate layer is disposed over the second electrode and the first thermally conductive substrate layer. Alternatively, the process 134 may provide an insulating substrate having one or more thermally conductive members extending therethrough, e.g., a plurality of vias. This step 146 also may include disposing the thermally conductive substrate layer over the sealant layer if present. This step 146 also may comprise sealing the actuator and the first and second electrodes within a chamber between the first and second thermally conductive substrate layers.

Turning now to FIG. 13, a flow chart illustrates an exemplary method 148 of manufacturing the thermal transfer devices of FIG. 7 and FIG. 9 in accordance with embodiments of the present technique. The process 148 begins by providing a first substrate layer (block 150). For example, the step 150 may include providing a thermally conductive substrate layer or an insulating substrate layer having one or more thermally conductive members extending therethrough, e.g., a plurality of vias. Next, the process 148 disposes a plurality of actuators over the first substrate layer at peripheral locations (block 152). For example, the plurality of actuators may comprise piezoelectric actuators, magnetic repulsion actuators, or electrostatic actuators. Moreover, block 152 of the process 148 may include extending first and second actuator electrodes to the actuator. In addition, this step 152 may further comprise coupling the actuator to an input voltage source adapted to operate the thermal transfer device at an initial tunneling set point.

Further, at block 154, the first electrode is positioned adjacent the actuator. At block 156, a release layer is disposed over the first electrode. At block 158, a second electrode is positioned over the release layer. Next, a second substrate layer is disposed over the second electrode and the plurality of actuators (block 160). For example, the step 160 may include providing a thermally conductive substrate layer or an insulating substrate layer having one or more thermally conductive members extending therethrough, e.g., a plurality of vias. Finally, the process 148 comprises sealing the actuator and the first and second electrodes within a chamber between the first and second substrate layers.

Figure 14:
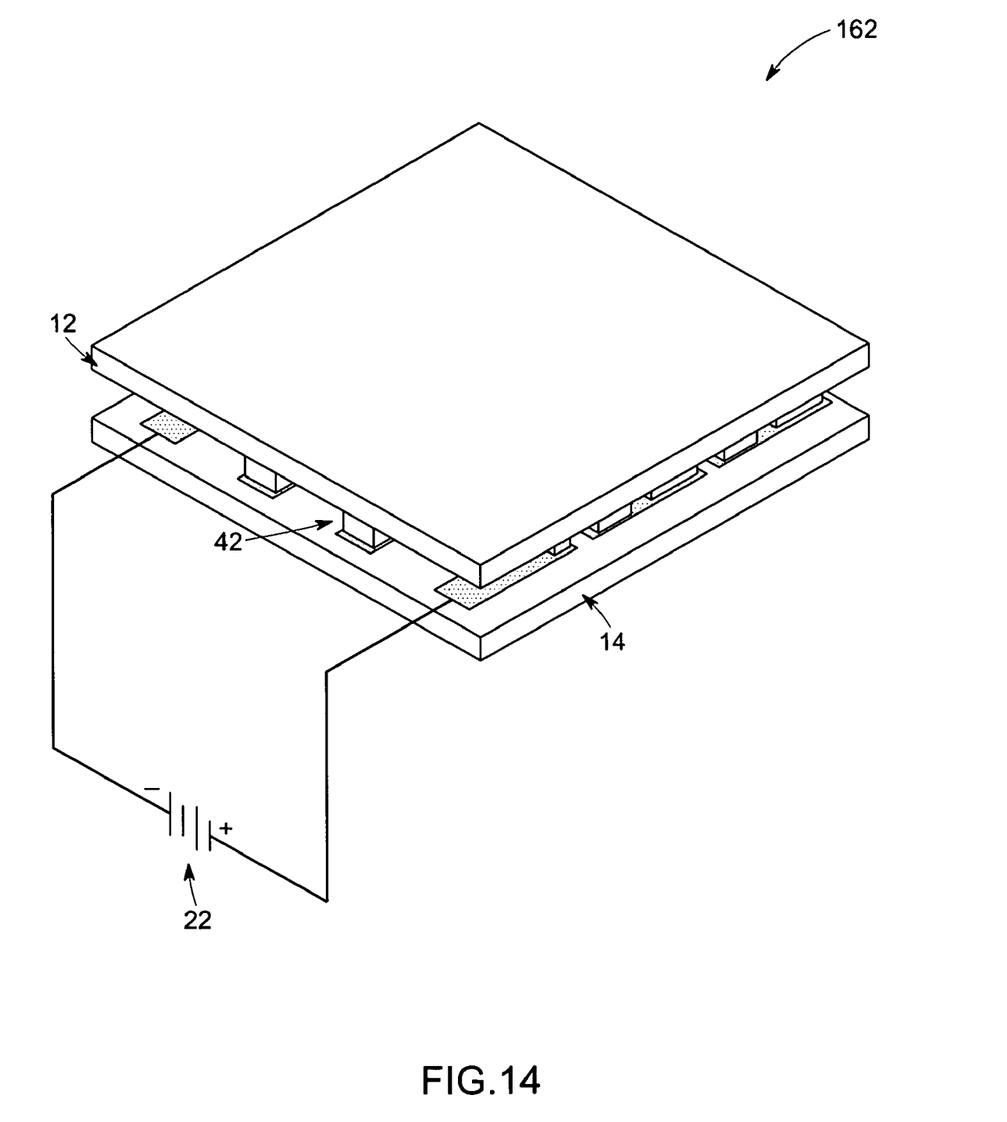
FIG. 14 is a diagrammatic illustration of a module having an array of thermal devices in accordance with embodiments of the present technique.

FIG. 14 illustrates a module 162 having an array of thermal devices 42 in accordance with embodiments of the present technique. In this embodiment, the thermal transfer devices 42 are employed in an array to meet a thermal management need of an environment. The thermal transfer devices may be assembled into a module where the devices are coupled electrically in series and thermally in parallel to enable the flow of electrons from first object 12 in the module 162 to the second object 14 in the module 162, thus transferring the heat from the first object 12 to the second object 14.

The various aspects of the technique described hereinabove find utility in a variety of heating and cooling systems, such as refrigeration, air conditioning, electronics cooling, industrial temperature control, power generation, and so forth. These include air conditioners, water coolers, refrigerators, heat sinks, climate control seats and so forth. As noted above, the method described here may be advantageous in relatively precise control of the spacing and alignment between adjacent electrodes of a thermotunneling device to meet the desired thermal management needs in the environments mentioned above.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A thermal transfer device comprising:
   a first substrate layer;
   a second substrate layer;
   a first electrode disposed between the first substrate layer and the second substrate layer;
   a second electrode disposed between the first substrate layer and the second substrate layer;
   a release layer disposed between the first electrode and the second electrode; and
   an actuator disposed adjacent the first and second electrodes, wherein the actuator is adapted to separate the first and second electrodes from the release layer to open a thermotunneling gap between the first and second electrodes, and wherein the actuator is adapted to actively control the thermotunneling gap.

2. The device of claim 1, wherein the first substrate layer is disposed above the second substrate layer, the first electrode is disposed below the second electrode, and the actuator is disposed below the second electrode and the thermotunneling gap.

3. The device of claim 1, wherein the first substrate layer is disposed above the second substrate layer, the first electrode is disposed above the second electrode, and the actuator comprises at least one actuator mechanism disposed on each peripheral side of the thermotunneling gap between the first and second substrate layers.

4. The device of claim 1, wherein the actuator and portions of the first and second electrodes having the thermotunneling gap are hermetically sealed within a chamber between the first and second substrate layers.

5. The device of claim 4, wherein the chamber is in vacuum.

6. The device of claim 1, wherein the actuator is coupled to an input voltage source adapted to operate the thermal transfer device at an initial tunneling set point.

7. The device of claim 1, comprising a feedback mechanism operatively coupled to the actuator, wherein the feedback mechanism is adapted to measure a tunneling current across the first electrode and the second electrode.

8. The device of claim 1, comprising a processor adapted to provide a position of the first electrode and the second electrode to the actuator based upon a measured tunneling current across the first electrode and the second electrode.

9. The device of claim 1, wherein at least one of the first and second substrate layers comprises a thermally conductive material.

10. The device of claim 9, wherein the thermally conductive material comprises ceramic.

11. The device of claim 1, wherein the at least one of the first and second substrate layers has an adjacent one of the first and second electrodes plated onto the thermally conductive material.

12. The device of claim 1, wherein at least one of the first and second substrate layers comprises a thermally insulating material disposed about a thermally conductive material in thermal communication with an adjacent one of the first and second electrodes.

13. The device of claim 12, wherein the thermally insulating layer comprises epoxy.

14. The device of claim 12, wherein the thermally conductive material comprises copper.

15. The device of claim 12, wherein the thermally conductive material comprises a plurality of thermal vias distributed in the thermally insulating material.

16. The device of claim 12, wherein the at least one of the first and second substrate layers comprises a central portion and opposite outer portions, the central portion comprising the thermally conductive material and the opposite outer portions comprising the thermally insulating material.

17. The device of claim 16, wherein the at least one of the first and second substrate layers comprises a thermal break portion between the central portion and each of the opposite outer portions.

18. The device of claim 1, wherein at least one of the first and second electrodes comprises a carbon nanotube layer.

19. The device of claim 1, wherein at least one of the first and second electrodes comprises copper.

20. The device of claim 1, wherein the release layer comprises a non oxidizing noble metal.

21. The device of claim 1, wherein the release layer comprises gold.

22. The device of claim 1, wherein the actuator comprises a piezoelectric mechanism.

23. The device of claim 1, wherein the actuator comprises a magnetic repulsion mechanism.

24. The device of claim 1, wherein the actuator comprises an electrostatic mechanism.

25. The device of claim 1, wherein the actuator comprises an acoustic actuator.

26. The device of claim 1, wherein the actuator comprises a Micro-Electro-Mechanical System (MEMS) device.

27. A thermal transfer device, comprising:
a first thermally conductive substrate layer;
a second thermally conductive substrate layer disposed below the first thermally conductive substrate layer;
a first electrode disposed between the first thermally conductive substrate layer and the second thermally conductive substrate layer;
a second electrode disposed between the first thermally conductive substrate layer and the second thermally conductive substrate layer, wherein the second electrode is disposed above the first electrode;
a release layer disposed between the first electrode and the second electrode; and
an actuator disposed below the second electrode, wherein the actuator is adapted to separate the release layer between the first and second electrodes to provide a thermotunneling gap between the first and second electrodes, and wherein the actuator is adapted to actively control the thermotunneling gap.

28. The device of claim 27 comprising a sealant layer disposed between the first and second thermally conductive substrate layers at an outer periphery surrounding the thermotunneling gap.

29. The device of claim 28, wherein the sealant layer comprises frit glass.

30. The device of claim 28, wherein the sealant layer comprises solder.

31. The device of claim 30, wherein the chamber is in vacuum.

32. The device of claim 27, wherein the actuator is coupled to an input voltage source adapted to operate the thermal transfer device at an initial tunneling set point.

33. The device of claim 27, wherein at least one of the first and second thermally conductive substrate layers comprises a ceramic.

34. The device of claim 27, wherein the actuator and portions of the first and second electrodes having the thermotunneling gap are hermetically sealed within a chamber between the first and second thermally conductive substrate layers.

35. The device of claim 27, wherein at least one of the first and second electrodes comprises a carbon nanotube layer.

36. The device of claim 27, wherein at least one of the first and second electrodes comprises copper.

37. The device of claim 27, wherein the release layer comprises a nonoxidizing noble metal.

38. The device of claim 27, wherein the release layer comprises gold.

39. The device of claim 27, wherein the actuator comprises a piezoelectric mechanism.

40. The device of claim 27, wherein the actuator comprises a magnetic repulsion mechanism.

41. The device of claim 27, wherein the actuator comprises an electrostatic mechanism.

42. The device of claim 27, wherein the actuator comprises an acoustic actuator.

43. The device of claim 27, wherein the actuator comprises a MEMS device.

44. The device of claim 27, comprising first and second actuator electrodes disposed between the first and second thermally conductive substrate layers and extending to the actuator.

45. The device of claim 27, wherein at least one of the first and second thermally conductive substrate layers comprises a copper spreader disposed in thermal communication with an adjacent one of the first and second electrodes.

46. The device of claim 45, comprising a thermal break extending between the copper spreader and the at least one of the first and second thermally conductive substrate layers.

47. The device of claim 46, wherein the thermal break comprises glass.

* * * * *